(12) United States Patent
Petty et al.

(10) Patent No.: US 6,397,269 B1
(45) Date of Patent: May 28, 2002

(54) MULTIPLEXING PINS OF A PC CARD FOR PROVIDING AUDIO COMMUNICATION BETWEEN THE PC CARD AND HOST COMPUTER

(75) Inventors: John S. Petty, Chapel Hill; I. Nelson Wakefield, Cary, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/266,454

(22) Filed: Mar. 11, 1999

(51) Int. Cl.[7] ............................ G06F 13/14; G06F 13/20
(52) U.S. Cl. ........................ 710/8; 710/13; 710/33; 710/35; 710/62; 710/301; 710/302
(58) Field of Search ............................... 710/302, 100, 710/301, 8, 13, 33, 35, 62

(56) References Cited

U.S. PATENT DOCUMENTS

| | | |
|---|---|---|
| 5,625,843 A | 4/1997 | Lee |
| 5,701,515 A | 12/1997 | Gradeler |
| 5,748,913 A * | 5/1998 | Shibahara .................... 395/282 |
| 5,752,082 A | 5/1998 | Staples ........................ 395/882 |
| 5,799,036 A | 8/1998 | Staples |
| 5,933,430 A * | 8/1999 | Osakabe et al. ............. 370/395 |
| 6,005,414 A * | 12/1999 | Reay .............................. 326/83 |
| 6,147,765 A * | 11/2000 | Yoneda ...................... 358/1.15 |
| 6,208,126 B1 * | 3/2001 | Gonthier ...................... 323/324 |
| 6,292,863 B1 * | 9/2001 | Terasaki et al. ............. 710/129 |

FOREIGN PATENT DOCUMENTS

EP          0803799          10/1997

* cited by examiner

Primary Examiner—Jeffrey Gaffin
Assistant Examiner—Rehana Perveen
(74) Attorney, Agent, or Firm—Coats & Bennett, P.L.L.C.

(57) ABSTRACT

A method and apparatus multiplexes pins of a PC card (104) to provide communication of two-way, high quality audio data between the PC card and a host computer (102) over a conventional PC card connector. The PC card includes one or more signal drivers (310), each signal driver coupled to a unidirectional signal line conventionally conveying address data from the host computer to the PC card. The signal drivers are configured to provide data signals to the signal line for communication to the host computer in an active mode and to enter a high impedance state in an inactive mode in response to a control signal received at a control input (314).

17 Claims, 3 Drawing Sheets

MULTIPLEXING PINS OF A PC CARD FOR PROVIDING AUDIO COMMUNICATION BETWEEN THE PC CARD AND HOST COMPUTER

BACKGROUND OF THE INVENTION

The present invention relates generally to data communication. More particularly, the present invention relates to multiplexing pins of a PC Card for providing audio communication between the PC Card and a host computer.

PC or PCMCIA Cards have been developed to provide additional data processing capabilities in data processing systems such as a personal computer. A PC Card may be plugged into a standard connector and operated in conjunction with the host computer.

The PC Card connector and data interchange formats are standardized. Mechanical and electrical standards have been established to ensure proper connection of PC Card to host. In particular, the PC Card has a 68 pin connector and its pins are in a standardized arrangement. Each pin has a defined function. Standardization ensures that PC Cards from different manufacturers will work in all host equipment.

One limitation to the standardized pin arrangement is in the area of audio processing. The conventional 68 pin PC Card connector includes a single pin for communication of audio from PC Card to host. No provision is made for transmission of audio from the host to the PC Card. Moreover, the one pin available yields poor quality when used for audio. No spare pins are available for further communication of audio.

Audio data could be transferred using the standard PC Card data bus. However, such a design would create a continuous stream of data on the data bus which would put an undesirably large load on the processor of the host.

One prior design has identified a modification to the host computer to permit two way audio communication. In U.S. Pat. No. 5,752,082, the host computer is modified so that digitized audio may be serially transferred between the host and a PC Card with no processor bandwidth. A multiplexer is inserted in the connection between the PC Card socket controller in the host computer and the PC Card socket in the host. The multiplexer either allows regular PC Card signals to pass between the socket controller and the socket or the multiplexer switches digitized audio signals onto the socket.

The earlier design does not address the PC Card side of the interface. Accordingly, an improved PC Card is desirable for providing two way audio when used in conjunction with a host computer.

BRIEF SUMMARY OF THE INVENTION

By way of introduction only, a PC Card in accordance with the present embodiment includes designation of four normally unidirectional signal lines in the PC Connector for bi-directional communication.

The PC Card includes signal drivers having a control input. When the associated pins are inactive, the signal drivers are electrically disconnected from the PC Card pins or placed in a high impedance state. In the inactive mode, the PC Card operates as a conventional PC Card.

When placed in an active mode by asserting the control signal, the signal drivers are electrically coupled to the pins of the PC Card connector for two way communication of digitized audio data.

In one embodiment, the control signal is generated by circuitry in the PC Card. In another embodiment, the control signal is generated by the host and communicated over the connector.

DETAILED DESCRIPTION OF THE PRESENTLY PREFERRED EMBODIMENTS

Figure 1:
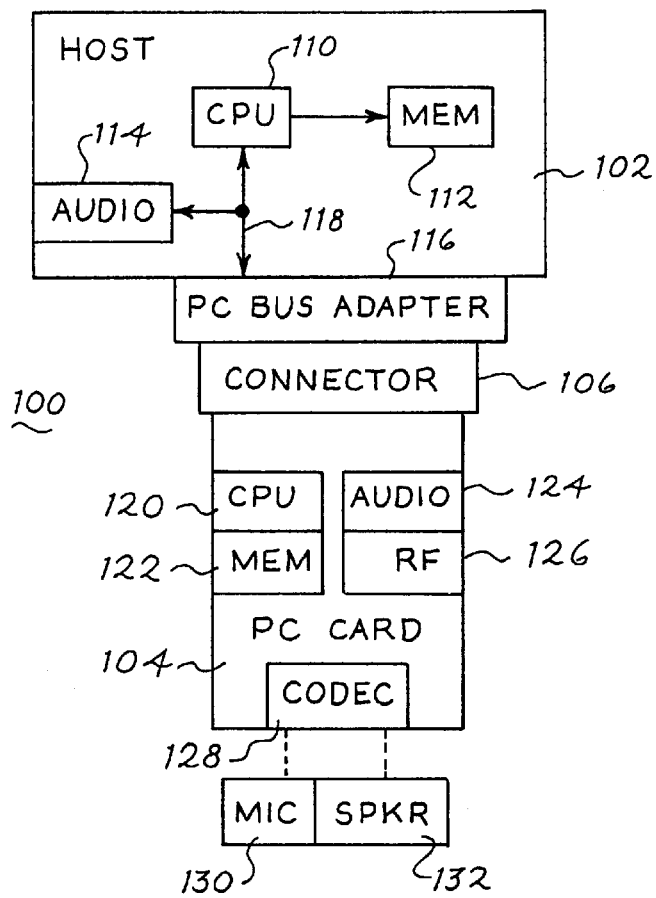
FIG. 1 is a block diagram of a data processing system.

Referring now to the drawing, FIG. 1 shows a block diagram of a data processing system 200. The system 100 includes a host computer 102, a PC card 104 and a connector 106. The system 100 is exemplary only and is intended solely to illustrate the environment in which the presently preferred embodiment of the present invention may be employed. In the illustrated embodiment, the host computer 102 is a personal computer and the PC card 104 provides wireless communication capability for the host computer. More particularly, the host computer 102 is a lap top or similar computer and the PC Card 104 is a wireless modem that provides voice and data communication over a cellular, personal communication system (PCS) or other wireless network.

The host computer 102 includes a central processing unit (CPU) 110, memory 112, audio circuitry 114, a PC bus adapter 116 and a bus 118. The CPU 110 controls the operation of the host computer 102. The CPU 110 operates in response to instructions and data stored in the memory 112. The memory 112 includes semiconductor memory and may further include disk memory on magnetic media or CD ROM. The host computer 102 is conventionally designed and may be a general purpose electronic device, such as a personal computer or laptop computer, or may be intended for a more specific purpose, such as a personal digital assistant (PDA). In general, the host computer 102 provides data processing and includes a facility for detachably mounting a PC Card to the host computer 102.

In one embodiment, the audio circuitry 114 includes a microphone and a speaker to provide voice communication for the host computer 102. These may be permanently mounted into the host computer 102 or may be detachable. It is envisioned that the host computer 102 has capabilities for data and voice communication.

The PC bus adapter 116 communicates data between the bus 118 and the connector 106. The PC bus adapter 116 is configured to translate between data communication formats used on the bus 118 within the host computer 102 and the data communication format and pinout required by the connector 106.

The connector 106 is a PC card compatible connector. Thus, the connector 106 conforms to electrical and mechanical standards established for PC cards. The connector 106 is configured for electrical and mechanical mating between the PC card 104 and the host computer 102. In particular, the connector 106 conforms to the standard 68 pin pinout for PC card connectors.

The connector 106 may be considered to include a host connector portion and a card connector portion. The host connector portion is fixedly attached to the host computer 106. The card connector portion is fixedly attached to the PC card 104. Fixed attachment generally includes soldering of electrical conductors of the respective connector portion to a printed circuit board of the respective component. The connector portion may also be otherwise mechanically attached as well. The two connector portions are designed to mate mechanically and electrically to connect the PC card 104 to the host computer 106.

The mechanical and electrical specifications for PC card connectors, including the pinout of the 68 pin connector and functional designation of each pin, form a standard arrangement. The standard arrangement includes one or more normally unidirectional signal lines defined according to the standard arrangement for one-way communication from the host computer to the PC card. These unidirectional signal lines include address lines for addressing memory on the PC card 104 by the CPU 110 of the host computer.

The PC card 104 is configured for attachment to the host computer 102. In the illustrated embodiment, the PC card 104 forms a wireless modem. In other embodiments, the PC card 104 may perform other functions. The PC card 104 includes a central processing unit (CPU), memory 122, an audio circuit 124 and a radio frequency (RF) section 126. In the illustrated embodiment, the PC card 104 further includes a codec 128 to which has been coupled a microphone 130 and a speaker 132.

The CPU 120 controls operation of the PC card 104 in response to instructions and data stored in the memory 122. The memory 122 is typically semiconductor memory. In accordance with PC card convention, the memory 122 may be accessed by the CPU 110 of the host computer using address and data lines provided by the PC bus adapter 116 and the connector 106.

The audio section 124 processes digital data representative of speech and in one embodiment includes a speech coder. The RF section 126 provides wireless communication to a remote radio apparatus. Such wireless communication includes, for example, cellular communication, or personal communication systems (PCS). The codec 128 converts between digital data representative of audio and analog audio signals. The microphone 130 and the speaker 132 may be optionally included with the PC card 104 if the host computer 102 does not include the audio section 114. The microphone 130 and the speaker 132 give the system 100 full two-way speech communication capability.

Figure 2:
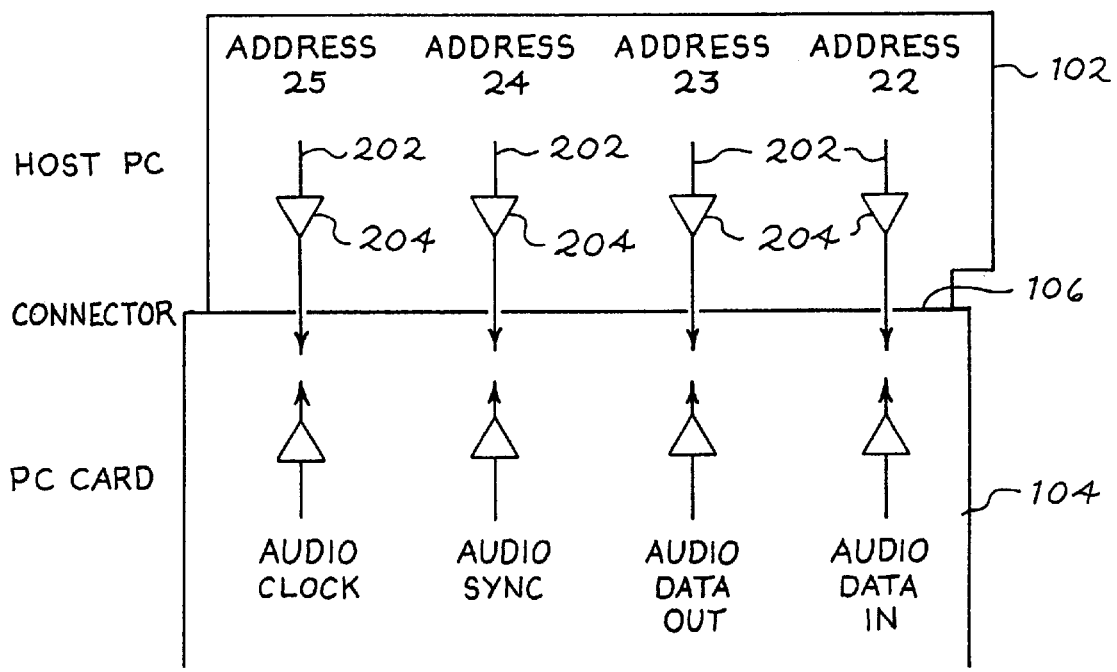
FIG. 2 illustrates connections between a PC Card and a host computer according to a previous design.

FIG. 2 illustrates connections between a PC card 104 and a host computer 102 according to a previous design. FIG. 2 illustrates some of the connections at the connector 106 between the host computer 102 and the PC card 104. Specifically, the high order address lines 202 are shown and labeled address 25, address 24, address 23 and address 22. The PC card bus between the host computer and the PC card includes other power, ground and signal lines. The address lines 202 illustrated in FIG. 2 are used for conveying address information from the host computer 102 to the PC card 104. According to the standard arrangement, address lines including the address lines 202 are normally unidirectional signal lines and are defined according to the standard arrangement for one-way communication from the host computer 102 to the PC card 104. Each of the address lines 202 includes a signal driver 204 configured to electrically drive an electrical signal on the connector and on the PC card.

At the PC card 104, four signals are established to provide two-way audio communication. The signals include an audio clock, audio sync, audio data out and audio data in. The first three signals are outputs from the PC card while the last signal, audio data in is an input to the PC card 104. These four signals are conventionally used for conveying digital audio data serially. Many other devices with which the PC card 104 may interface employ these same digital signals for communicating digital data representative of audio information.

The PC card connector 106 uses the conventional PC card pinout. This pinout makes no provision for two-way communication of audio data and does not provide additional pins for that purpose. The proposed connections for the PC card 104 illustrated in FIG. 2 are incompatible with the connector 106 and host PC 102, which employ the conventional PC card pinout.

Figure 3:
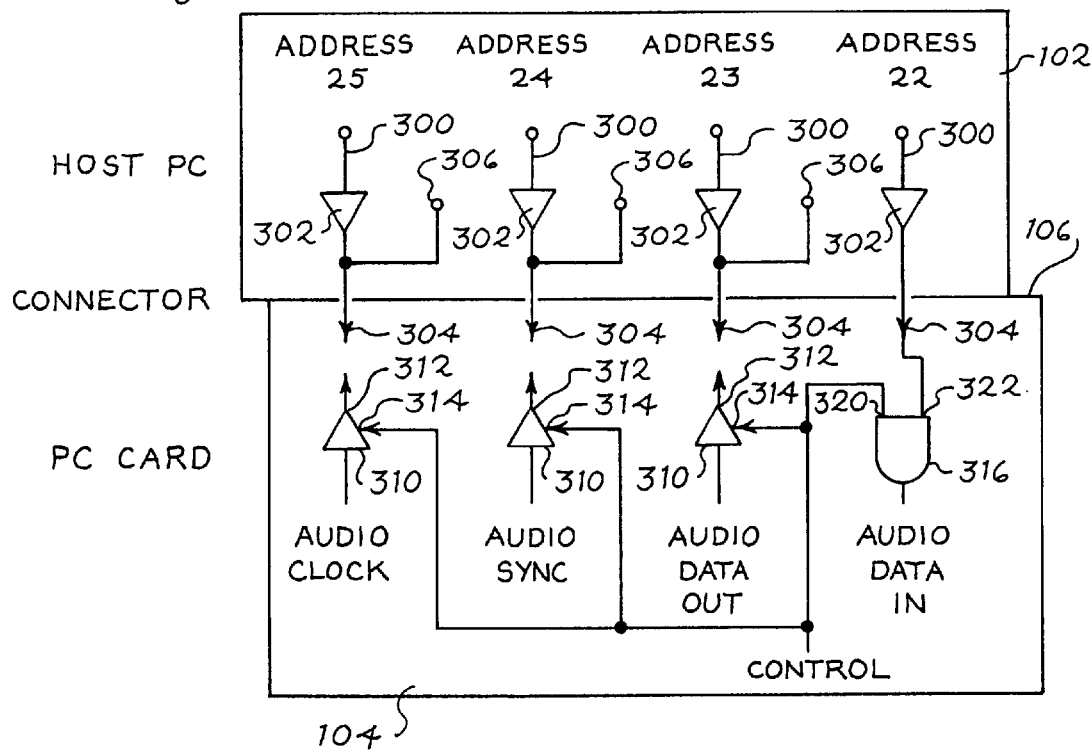
FIG. 3 illustrates connections between a PC Card and a host computer according to one embodiment.

Referring now to FIG. 3 it shows connections between a PC card 104 and a host computer 102 according to one embodiment. In FIG. 3, the high order address lines 300, labeled address 25, address 24, address 23 and address 22, each terminate in signal drivers 302. The signal drivers 302 provide unidirectional communication of data from the host computer to the PC card.

The output of each signal driver 302 is coupled to the connector 106. The connector 106 includes terminals 304 for plugging engagement with the PC card 104. The connector 106 employs the conventional PC card pinout in which the location and function of 68 pins of the connector are defined according to a standard arrangement. The connector 106 typically comprises a card connector portion and a host connector portion.

The output of the signal drivers 302 coupled to the highest order address lines, labeled address 25, address 24 and address 23 has been modified to include a signal input 306 which is electrically coupled to the terminal 304. The other end of the signal input 306 is electrically coupled to circuitry (not shown) of the host computer 102 for communicating audio data and other data from the PC card.

The PC card 104 includes one or more signal drivers 310. Each signal driver has an output 312 coupled to a unidirectional signal line through the connector 106 and a control input 314. Each signal driver 310 is configured to provide a data signal to the signal line for communication to the host computer in an active mode and to enter a high impedance state in an inactive mode in response to a control signal received at the control input.

The PC card 104 further includes a logic gate 316. In the illustrated embodiment, the logic gate 316 is an AND gate, but other suitable logic functions may be used. The audio data in-line is provided at the output of the logic gate 316 which receives audio data from the signal line address 22 of the host computer. The other input 320 of the logic gate 316 operates as a control input to control the logic gate 316 in response to a control signal received at the control input.

In one embodiment, the signal drivers 310 are tri-state buffers. When a control signal is asserted at the control input 314, the tri-state buffer conveys the binary data signal at its input to its output. When the control signal at the control input 314 is not asserted, the tri-state buffer enters a high impedance state in which it appears to be disconnected from the output. Various suitable tri-state buffers are known to those ordinarily skilled in the art, including bipolar and CMOS integrated circuit implementations.

At the logic gate 316, the control signal operates to enable the logic gate 316 to convey the data received at its input to its output. Since the logic gate 316 is an AND gate, if the control signal has a logic 1 value, the data at the input 322 is conveyed to the output of the AND gate. If the control signal has a logic 0 value, the signal at the output of the AND gate is maintained at a logic 0 value and the gate is effectively disabled.

Thus, the state of the control signal determines the nature of the PC card 104. When the control signal has a first state, the PC card 104 operates as a conventional PC card and the unidirectional signal lines (address 25 through address 22 in the illustrated embodiment) are treated by the PC card as they are conventionally defined by the standard arrangement. This may be called the inactive mode. When the control signal has a second state, the PC card 104 operates in a modified manner for two-way communication of digital audio data. The operational definition of the unidirectional lines changes from the definition of the standard arrangement. This may be called the active mode. Both the host computer 102 and the PC card 104 must be aware of the operation in the active mode so that data is reliably communicated.

The control signal may be provided by either the PC card 104 or the host computer 102. In one embodiment, the control input 314 of the signal drivers 310 and the input 320 of the AND gate 316 are coupled to a signal line conveyed on the connector 106 from the host PC and configured to receive the control signal from the host computer 102. However, as noted above, the PC Card standard does not have any spare pins available for conveying such a control signal, so such an embodiment is not suitable for a connector system conforming to the PC Card standard. In another embodiment, the control input 314 and the input 320 are coupled to circuitry of the PC card 104 such as the CPU 120 (FIG. 1), and are configured to receive the control signal from the circuitry.

In yet another embodiment, the PC card circuitry includes one or more storage locations, such as in the memory 122, configured to be written with control data from the host computer. For example, the circuitry on the PC card 104 decodes an address in the address space of the PC card 104. A one byte or one word register is located at the decoded address. The control signal is generated by circuitry of the PC card 104 in response to the bit written in the register by the host computer 102. In this embodiment, the default (for example, at power-on or after a reset) is the value of the control signal that allows the card to be installed in a conventional host computer 102.

Figure 4:
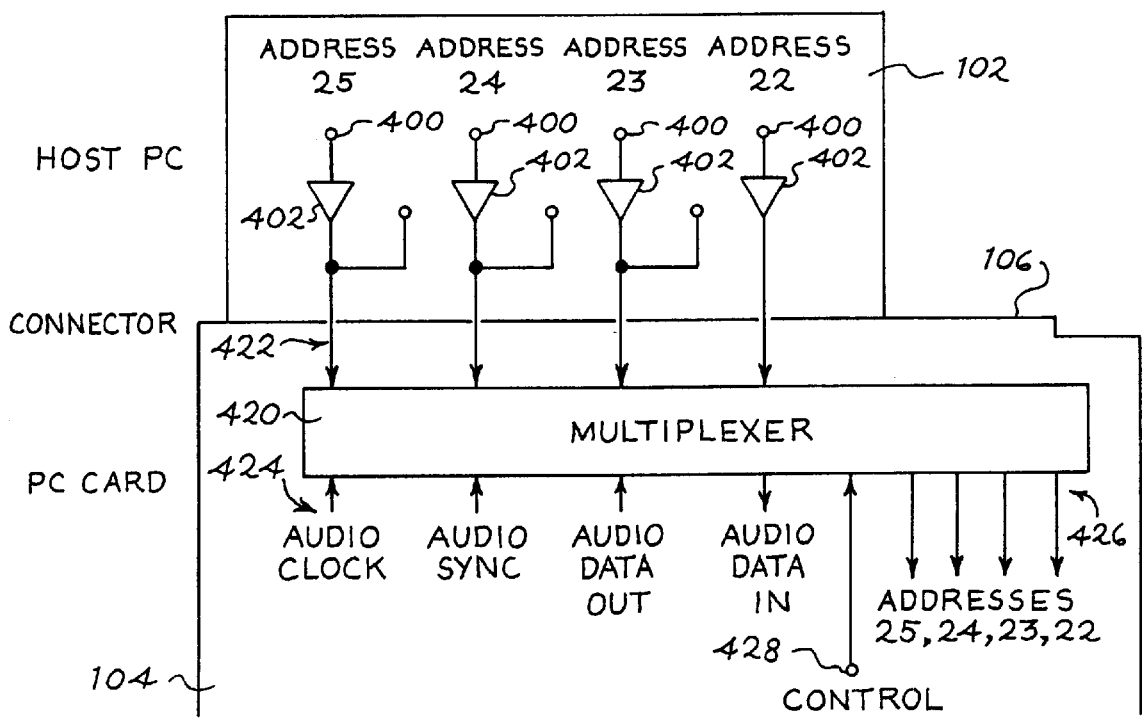
FIG. 4 illustrates connections between a PC Card and a host computer according to a second embodiment.

Referring now to FIG. 4, it illustrates connections between a PC card 104 and a host computer 102 according to a second embodiment. The embodiment illustrated in FIG. 3 is suitable if the PC card 104 does not normally use the four high-order address lines, referred to as address 25, address 24, address 23, address 22. If these high order address lines are used by the PC card, or if other unused lines are not available on the connector 106, then the PC card 104 must include a switch such as a multiplexer to control the direction of data flow between the host computer 102 and the PC card 104. Such an embodiment is illustrated in FIG. 4.

FIG. 4 illustrates a PC card 104 coupled through a connector 106 to a host computer 106. The connector 106 and its interface with the host computer 102 conform to the standard arrangement for PC card connections. The PC card 104 is modified to permit two way communication of digital audio data.

In FIG. 4, the function of the one or more signal drivers and logic gate of FIG. 3 are provided by a multiplexer circuit 420. The multiplexer circuit 420 has a port 422 coupled to the unidirectional signal lines 400, an input 424 coupled to other circuitry such as audio circuitry of the PC card 104, and an Output 426 coupled to circuitry of the PC card 104, such as memory and logic circuitry. The multiplexer circuit 420 further includes a control input 428 for receiving a control signal. The control signal at the control input 428 controls data flow in the multiplexer circuit 420. The control signal may originate at the host computer 102 or the PC card 104.

When the control circuit is at a first logic level, address signals on the unidirectional signal lines 400 pass through the multiplexer circuit 420 to the output 426. From the output 426, the address signals are conveyed to whatever circuits on the PC card 104 use those signals. For example, in one embodiment the output 426 is coupled to semiconductor memory circuits. The signals provided at the output 426 are logically identical to the signals received at the port 422 from the unidirectional signal lines. When the control signal at the control input 428 is in a second logic state the audio signals at the input 424 are connected to the address lines, unidirectional signal lines 400. In this manner, the audio clock and audio sync signals as well as the audio data out data are conveyed from the PC card 104 to the unidirectional signal lines 400 and the audio data in data is conveyed from the unidirectional signal line 400 to the PC card 104.

In the preferred embodiment, the multiplexer circuit 420 includes one or more signal drivers suitable for receiving electrical signals from the connector 106 and the host computer 102 as well as driving electrical signals from the PC card 104 to the connector 106 and the host computer 102. Any suitable logic and other circuitry may be used to construct the multiplexer circuit 420.

Figure 5:
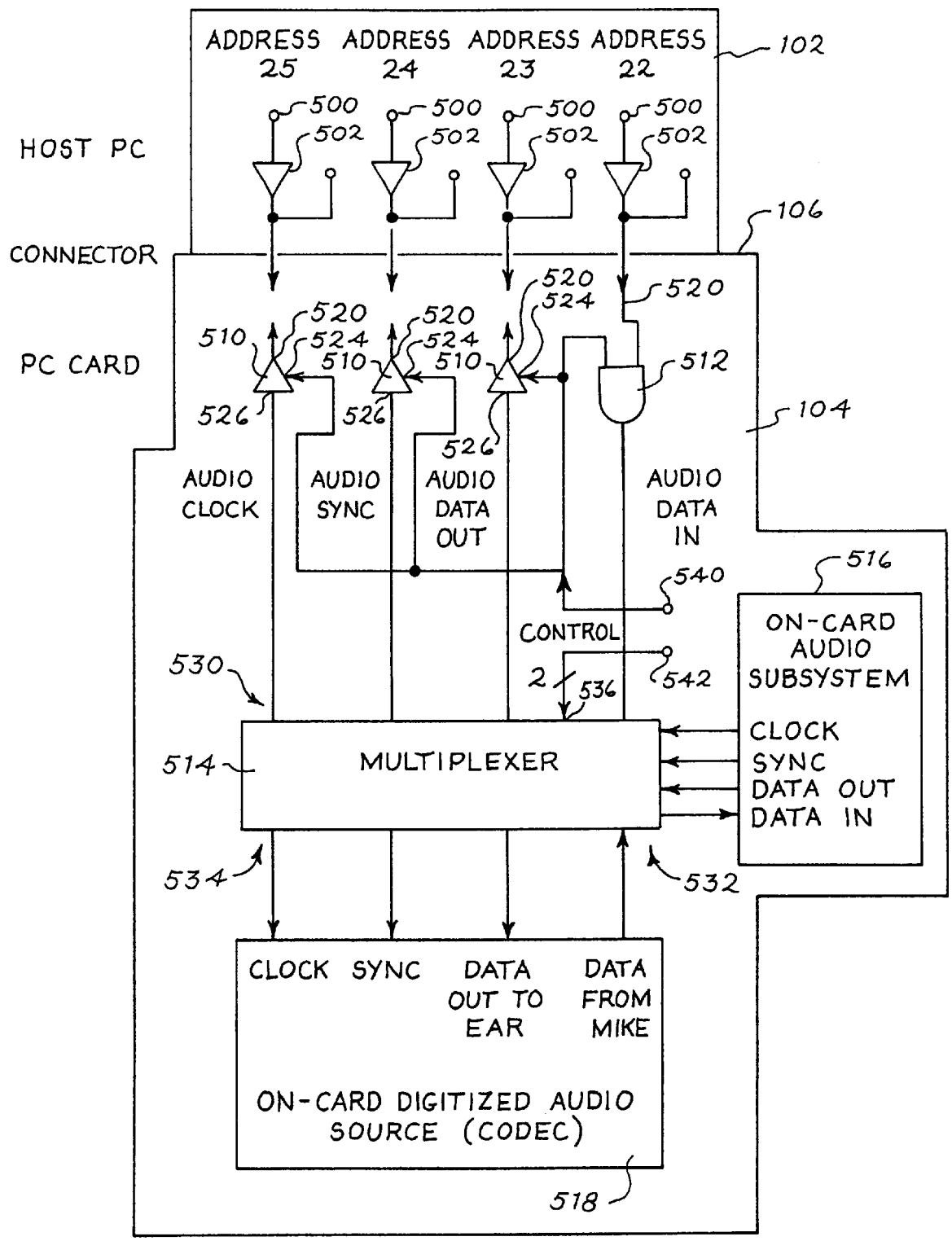
FIG. 5 illustrates connections between a PC Card and a host computer according to a third embodiment.

FIG. 5 illustrates connections between a PC card 104 and a host computer 102 according to a third embodiment. FIG. 5 illustrates a PC card 104 coupled through a connector 106 to a host computer 106. The connector 106 and its interface with the host computer 102 conform to the standard arrangement for PC card connections. The PC card 104 is modified to permit two way communication of digital audio data. The PC card 104 includes one or more signal drivers 510, a logic circuit 512, a multiplexer circuit 514, and on-card audio subsystem 516 and an on-card digitized audio source 518.

The signal drivers 510 include an output 520 coupled to a unidirectional signal line of the connector. The logic circuit 512 is an AND gate having one input coupled to a unidirectional signal line of the connector. The unidirectional signal lines are the high order address lines conventionally used by a host computer for addressing memory on a PC card. In the illustrated embodiment, the high order address lines, labeled address 25, address 24, address 23 and address 22, are not used for accessing the PC card. The signal drivers 510 further include a control input 524 and an input 526. A control signal is coupled to the control input 524 of the signal drivers 510 and to a second input of the logic gate 512. The control signal originates at the PC card 104.

The multiplexer 514 has a first port 530 for communicating data with the connector 106, a second port 532 for communicating data with the on-card audio system 516 and a third port 534 for communicating data with the on-card digitized audio source 518. The multiplexer further includes a control input 536 for controlling signal flow through the multiplexer 514. In the illustrated embodiment, the multiplexer 514 has three states for routing data and control signals. To control these states, the control input 536 receives two bits of control information or is coupled with two signal lines.

The on-card audio system 516 provides two-way communication of data representative of digitized speech. In the illustrated embodiment, the on-card audio subsystem 516 communicates speech data using four conventional signals, including an audio clock, audio sync, audio data out and audio data in. Further in the illustrated embodiment, the on-card audio subsystem 516 forms the speech processing portion of a wireless communication circuit. As such, the on-card audio subsystem 516 provides functions such as speech coding and speech decoding. The on-card audio system 516 forms an audio interface with a radio frequency circuit such as RF circuit 126 of FIG. 1.

The on-card digitized audio source 518 forms an audio interface with other audio features. In one exemplary embodiment, the PC card 104 includes a microphone and a speaker (not shown in FIG. 5). The microphone and speaker require analog audio signals whereas the PC card 104 including the interface with the host computer communicates digital audio data. The on-card digitized audio source 518 forms a coder-decoder (codec) for translating between analog audio signals and digital data. Output from the on-card digitized audio source 518 includes data from the microphone. Input to the on-card digitized audio source 518 includes an audio clock, audio sync and audio data.

In the illustrated embodiment, the system of the illustrated embodiment provides for several different audio processing paths. These are illustrated in the following table.

|   | Audio Signal Source/ Destination | Audio Processing | Application |
|---|---|---|---|
| 1 | On-card digitized audio source (codec) 518 | On-card audio subsystem 516 | Traditional cellular telephone call |
| 2 | Host PC 102 | On-card audio subsystem 516 | Answering machine or voice call with audio provided by host PC |
| 3 | On-card digitized audio source (codec) 518 | Host PC 102 | Voice recognition, dictation |

The multiplexer 514 controls connections between the audio source or destination and the component of the system which does the audio processing.

In operation, the PC card 104 responds to control signals received at a control input 540 and a control input 542. The control signal at the control input 540 controls the signal drivers 510 and the logic gate 512 for routing audio data between the PC card and the host PC. When the control signal at the control input 540 has a first value, the PC card 104 operates as a conventional PC card and the unidirectional lines 500 are not used for data transfer. When the control signal at the input 540 has a second value, the signal drivers 510 and the logic gate 512 enter an active state and audio data may be transferred between the host computer and the PC card.

The control input 542 receives a multiple bit control signal which controls the source and destination of audio data. When the control signal at the control input 542 as a first value, audio data is routed between the on-card digitized audio source 518 and the on-card audio subsystem 516. This corresponds to processing a traditional cellular telephone call.

When the control signal at the control input 542 has a second value, audio data is routed between the host PC 102 via the connector 106 and the on-card audio subsystem 516. In the illustrated embodiment, this permits wireless communication of voice data from the host computer to a remote radio receiver, using RF components of the PC card. This allows the host PC 102 to function as an answering machine or for processing of a voice telephone call with audio provided by the host PC 102.

When the control signal at the control input 542 has a third value, audio data is routed between the on-card digitized audio source 518 and the host computer 102. This permits a microphone and speaker to be connected directly to the PC card 104 and thus the host computer 102. As a result, the user need not move their microphone or speaker as they switch between communicating with the PC card 104 (say, as part of a cellular telephone call) and communicating with host PC 102 (for dictation or for voice operation of the host PC 102. Possible applications for such a configuration include voice recognition by the host PC 102 and speech to text processing of dictation.

The illustrated embodiments employ a four-wire audio data interface which matches a conventional industry standard. The four data signals conveyed include audio clock, audio sync, audio data out and audio data in. While the illustrated embodiments have included this conventional audio interface, other implementations of serial or parallel digital audio communication are possible. Such other implementations will also have the same general need to alter the use of one or more of the standard PC card interface pins for bi-directional communication. In one alternative embodiment, the embodiments of FIGS. 4 and 5 may be combined on a single PC card. This implementation would require two multiplexers. A first multiplexer, corresponding to multiplexer 420 (FIG. 4), would provide addressing by the host PC of a full range of memory locations on the PC card. A second multiplexer, corresponding to multiplexer 514 (FIG. 5), would provide access to on-card circuitry such as a codec and an on-card audio subsystem.

As can be seen from the foregoing, the present invention provides a method and apparatus for high quality audio data communication between a PC card and a host computer. A PC card is modified so that digitized audio data may be serially transferred between a host computer and the PC card with no processor bandwidth. The only necessary modifications are made to the PC card, which as modified can be used with conventional host computers or host computers configured to conform to the new design. The PC card thereby provides two-way communication of high quality audio when used in conjunction with the host computer.

While a particular embodiment of the present invention has been shown and described, modifications may be made. For example, any suitable switching circuit can be substituted for the multiplexer circuits illustrated in FIGS. 4 and 5. It is therefore intended in the appended claims to cover all such changes and modifications which follow in the true spirit and scope of the invention.

What is claimed is:

1. A PC card comprising:

a connector portion configured for attachment to a host computer, the connector portion including a plurality of signal lines in a standard arrangement, at least some of the signal lines being unidirectional signal lines for conveying information from the host computer to the PC card according to the standard arrangement;

circuitry coupled to the plurality of signal lines and configured to receive data from the host computer; and one or more signal drivers, each signal driver having an output coupled to a unidirectional signal line and a control input, the signal driver configured to provide a data signal to the signal line for communication to the host computer in an active mode and to enter a high impedance state in an inactive mode in response to a control signal received at the control input.

2. The PC card of claim 1 wherein the control input is coupled to a signal line and configured to receive the control signal from the host computer.

3. The PC card of claim 1 wherein the control input is coupled to the circuitry and configured to receive the control signal from the circuitry.

4. The PC card of claim 3 wherein the circuitry includes one or more storage locations configured to be written with control data from the host computer, the circuitry providing the control signal in response to the control data.

5. The PC card of claim 1 wherein the one or more signal drivers comprise tri-state drivers.

6. The PC card of claim 1 further comprising audio circuitry coupled to the one or more signal drivers and configured to communicate data representative of audio information to the host computer when the one or more signal drivers is in the active mode.

7. The PC card of claim 6 wherein the one or more signal drivers comprises a multiplexer circuit having a port coupled to the unidirectional signal lines, an input coupled to the audio circuitry and an output coupled to the circuitry.

8. The PC card of claim 1 wherein the connector portion is configured for electrical and mechanical mating with a host connector portion of the host computer, the connector portion comprising a plurality of pins arranged in a standard configuration for electrical engagement with a like plurality of pins of the host connector portion.

9. A method for exchange of audio data in a data processing system including a host computer and a PC card configured for attachment to the host computer in a standard arrangement, the standard arrangement including one or more normally unidirectional signal lines defined according to the standard arrangement for one-way communication from the host computer to the PC card, the method comprising the steps of:

at the PC card, electrically coupling one or more signal drivers to the one or more normally unidirectional signal lines;

communicating audio data from the PC card to the host computer over the one or more normally unidirectional signal lines; and at the host computer, receiving the audio data.

10. The method of claim 9 further comprising the step of selectively providing a control signal to the one or more signal drivers to electrically couple the one or more signal drivers to the one or more normally unidirectional signal lines.

11. The method of claim 10 further comprising the step of:

producing the control signal at circuitry of the PC card.

12. The method of claim 11 wherein the step of producing the control signal comprises the steps of:

receiving at the circuitry of the PC card a signal from the host computer; and producing the control signal in response to the signal.

13. The method of claim 10 further comprising the steps of:

producing the control signal at circuitry of the host computer; and communicating the control signal from the host computer to the PC card.

14. The method of claim 10 further comprising the steps of:

initially, electrically decoupling the one or more signal drivers from the one or more normally unidirectional signal lines; and coupling the one or more signal drivers to the one or more normally unidirectional signal lines only in response to an indication from the host computer that the host computer is configured to receive data on the one or more normally unidirectional signal lines.

15. A data processing system comprising:

a host computer; and a supplemental circuit coupled to the host computer according to a standard PC card arrangement including one or more normally unidirectional signal lines defined according to the standard arrangement for one-way communication from the host computer to the PC card, the supplemental circuit including one or more signal drivers configured for selective electrical coupling to the one or more normally unidirectional signal lines, and audio circuitry configured to communicate audio data from the PC card to the host computer over the one or more normally unidirectional signal lines.

16. The data processing system of claim 15 further comprising:

a connector coupled between the host computer and the supplemental circuit and including a plurality of signal lines arranged according to the standard PC card arrangement.

17. The data processing system of claim 16 wherein the supplemental circuit comprises a PC card configured for detachable coupling to the connector.

* * * * *